(12) United States Patent
Zanten et al.

(10) Patent No.: US 6,322,734 B1
(45) Date of Patent: Nov. 27, 2001

(54) METHOD FOR PREPARING OPEN-CELLED GROWING MEDIA AND GROWING MEDIA

(75) Inventors: Evert Van Zanten, DLNaaldwijk; Frans Leerdam, NT's-Gravenzande, both of (NL)

(73) Assignee: Preforma Westland B.V. (NL)

( * ) Notice: Subject to any disclaimer, the term of this patent is extended or adjusted under 35 U.S.C. 154(b) by 0 days.

(21) Appl. No.: 09/417,294

(22) Filed: Oct. 13, 1999

Related U.S. Application Data

(63) Continuation-in-part of application No. 08/894,109, filed on Sep. 8, 1997, now abandoned.

(30) Foreign Application Priority Data

| Feb. 13, 1995 | (WO) | PCT/NL95/00058 |
| Feb. 13, 1996 | (WO) | PCT/NL96/00218 |

(51) Int. Cl.7 ................. A01G 9/10; A01G 7/00
(52) U.S. Cl. .................. 264/42; 47/64
(58) Field of Search .................. 264/42; 47/64

(56) References Cited

U.S. PATENT DOCUMENTS

| 3,805,532 | 4/1974 | Kistner | 61/36 R |
| 4,114,316 | 9/1978 | Cohen | 47/64 |
| 4,175,355 | 11/1979 | Dedolph | 47/64 |
| 5,209,014 | 5/1993 | Teichmann | 47/73 |
| B1 3,805,532 | 7/1985 | Kistner | 405/264 |

FOREIGN PATENT DOCUMENTS

| 38 29 256 | 3/1989 | (DE) . |
| 0 086 918 | 8/1983 | (EP) . |
| 0 090 910 | 10/1983 | (EP) . |
| 0 346 627 | 12/1989 | (EP) . |
| 0 461 545 | 12/1991 | (EP) . |
| 2.115.783 | 6/1972 | (FR) . |

*Primary Examiner*—James Derrington
(74) *Attorney, Agent, or Firm*—Nields & Lemack

(57) ABSTRACT

A process for producing hydrophilic growing media, preferably plugs, providing growing media having improved properties and a minimal amount of binding agent. The method forms a resilient, integral, dimensionally stable cohesive, homogeneous mass by contacting an aggregate with a hydrophilic urethane prepolymer and water. Upon curing, the prepolymer binds the aggregate material together. The mixing of the aggregate, prepolymer and water is conducted under specific, carefully controlled conditions, which enables the use of less prepolymer than would otherwise be necessary to obtain a given strength and stable air space. As result, trays can be filled without necessity of retooling.

12 Claims, 1 Drawing Sheet

METHOD FOR PREPARING OPEN-CELLED GROWING MEDIA AND GROWING MEDIA

This application is a continuation-in-part of U.S. Ser. No. 08/894,109 filed Sep. 8, 1997 now abandoned.

BACKGROUND OF THE INVENTION

The present invention relates to stable growing media, such as plugs, for the germination of seeds and the growing or propagation of plants, and a method of manufacturing such growing media.

Plant seedlings or shoots can be planted in and grown in rooting media comprising soil mixture and a synthetic binder therefor, such as an organic resin polymer. Such rooting media or grow plugs eliminates the need to use pots, which add substantial weight and cost to transportation of plants. Such grow plugs are known, as is evident from U.S. Pat. No. 3,805,531, which discloses a rooting media formed by mixing a prepolymer with aggregate or soil mixture and adding water to the mixture. Upon curing of the prepolymer, a cohesive mass is formed. Similarly, U.S. Pat. No. 4,175,355 discloses soil plugs using a mixture of soil material comprising at least 15% polyurethane by weight on a dry basis of the soil material. A slurry is prepared by intensively mixing the prepolymer, soil material and water. The slurry is then cast into a die and after at least partial hardening of the polyurethane resin forming material, the resulting plug is removed from the die.

Because of the relatively high percentage of polyurethane in the plugs of the prior art, growing of the seedling is impeded. Indeed, it is generally believed that the less synthetic material in such plugs, the better the seedlings grow. Presumably the presence of the synthetic material impairs access of water and air to the plant roots. Ideally, therefore, grow plugs would contain no synthetic material. However, the synthetic material is a critical component of such plugs in order to provide a self-supporting, stable plug that does not disintegrate upon handling. Indeed, U.S. Pat. No. 4,175,355 discussed above expressly teaches that using less than about 15% polyurethane resin by weight on a dry basis results in the rooting media crumbling and falling apart. Moreover, plugs having a high concentration of polyurethane tend to be rubbery and insufficiently dense. As a result, the water retaining properties of such plugs are poor, and the penetration of air is impaired.

It would thus be highly desirable to produce a grow plug that mimics, as closely as possible, growing media that is free of synthetic material.

U.S. Pat. No. 5,209,014 discloses moulds for growing seedlings, the moulds being formed of turf, water, nutrients and a synthetic molding materials such as a polyurethane resin. The '014 patent states that the prepolymer is added in the amount of about 6 to 8% by weight to the turf mixture, the turf mixture first having been ground in a turf grinder. It is apparent from the disclosure that in referring to 6–8% prepolymer by weight of the dry mass, the term "dry mass" is being used to indicate turf mixture to which additional water has not yet been added.

That is, the turf mixture inherently contains moisture, and the "dry mass" referred to in the '014 patent includes that moisture, but does not include the water introduced to the turf mixture prior to the addition of the prepolymer. Were the amount of prepolymer in the '014 patent calculated on a true "bone dry" basis to be consistent with the other prior art, the percentage of prepolymer would be considerably more than the 6–8% disclosed.

It is therefore an object of the present invention to provide cohesive, stable, resilient, homogeneous, integral, self-supporting growing media with minimal amounts of synthetic material.

It is a further object of the present invention to provide growing media having improved water retaining properties and increased air space.

It is a still further object of the present invention to provide a process for preparing cohesive, stable, resilient, homogeneous, integral, self-supporting growing media with minimal amounts of synthetic binding material.

SUMMARY OF THE INVENTION

The problems of the prior art have been overcome by the present invention, which provides a process for producing hydrophilic growing media, preferably plugs, and provides growing media having improved properties and a minimal amount of binding agent. In general terms, a method is provided for forming a resilient, integral, dimensionally stable, cohesive, homogeneous mass by contacting an aggregate with a hydrophilic urethane prepolymer and water.

Upon curing, the prepolymer binds the aggregate material together.

The mixing of the aggregate, prepolymer and water is conducted under specific, carefully controlled conditions, which enables the use of less prepolymer to obtain a given strength and stable air space than would otherwise be necessary.

According to the invention a method is provided for preparing cohesive, stable, self-supporting, homogeneous, open celled growing media, said method comprising forming a slurry consisting essentially of aggregate, hydrophilic polyurethane prepolymer, and water; mixing said slurry at a temperature below about 20° C., said mixing being conducted for a time sufficient to create a homogeneous mix; pouring said mixture into at least one mould and allowing the mixture ultimately cure in said mould, wherein mixing is conducted longer than 30 sec. and shorter than 300 sec. under low sheer so as not to damage the aggregate particles.

According to a further aspect of the invention a method is provided for preparing cohesive, stable, self-supporting, homogeneous, open celled growing media, said method comprising forming a slurry consisting essentially of aggregate, hydrophilic polyurethane prepolymer, and water; mixing said slurry at a temperature below about 20° C., said mixing being conducted for a time sufficient to create a homogeneous mix; pouring said mixture into at least one mould and allowing the mixture ultimately cure in said mould, wherein during mixing about 90% of the volume increase in the transition from the slurry to cured growing media is effected. This will result in a negligible increase in volume after pouring said mixture into said mould. Because of that it is not necessary to take measures to maintain the volume of the material such as lids. It is possible to cast the mix in the moulds for the user and immediately after such casting shipment of the moulds is possible. According to a further aspect of the invention a stable self-supporting open celled growing media is provided comprising an aggregate being selected from the group comprising peat, soil, coir (coconut husk), perlite, vermiculite, pumice, baked clay, wood pulp, ground tree bark, sawdust, and mixtures thereof, said media having a dry density lower than 180 g/l. In particular the dry density is between 60 and 130 g/l.

DETAILED DESCRIPTION OF THE INVENTION

Figure 1:
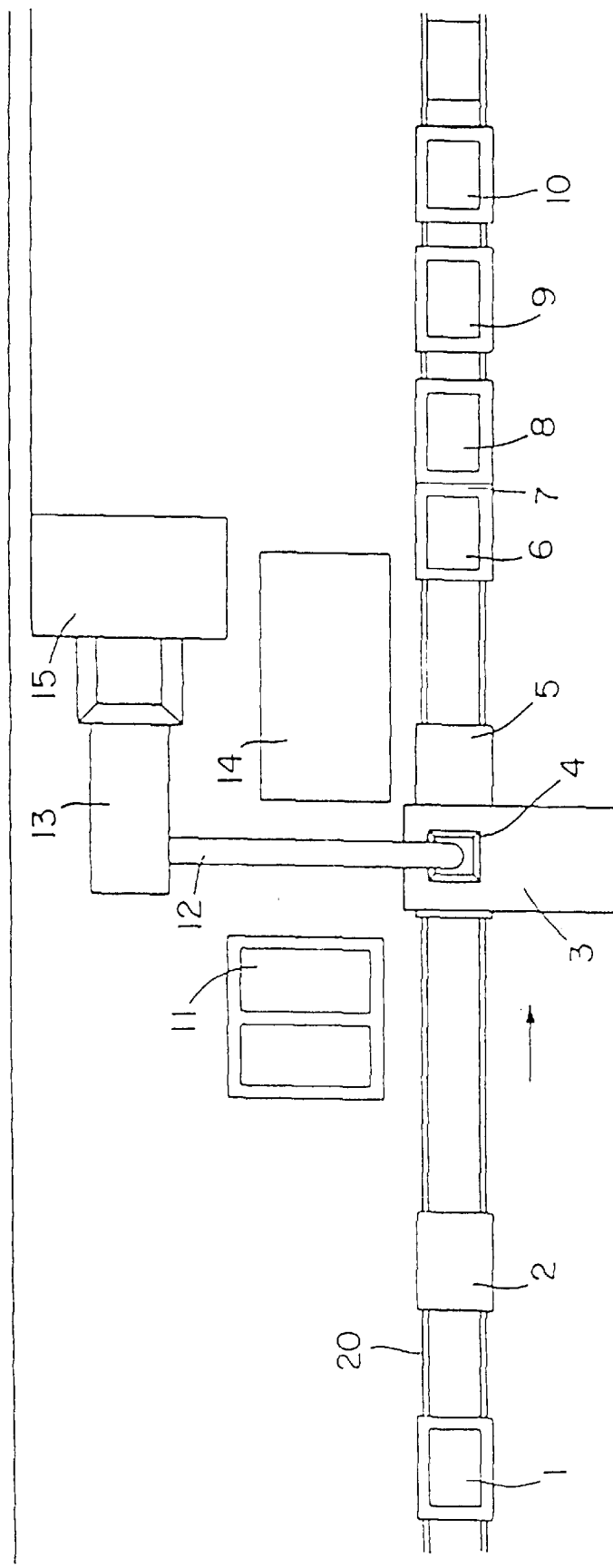
FIG. 1 is a front view of apparatus suitable for manufacturing grow plugs in accordance with the present invention.

Suitable aggregate that can be used in the present invention includes peat moss (including reed-sedge peat, sphagnum peat, horticultural sphagnum peat, and wood peat), soil, coir/cocospeat (coconut husk), perlite, vermiculite, pumice, baked clay, wood pulp, pine bark, ground tree bark, sawdust, and mixtures thereof. Peat is the preferred aggregate. The term "bone dry aggregate" as used herein means aggregate that has been oven-dried at 105° C. for 24 hours in order to remove the water therefrom.

In the case of peat moss, since the moisture content of commercially available peat moss varies, the peat should be conditioned prior to use. Specifically, the moisture content of the peat can be standardized by adding water thereto until the peat is saturated. The saturation point can be determined visually; it occurs when the peat ceases to absorb water.

Suitable binding agents for the plugs of the present invention include hydrophilic polyurethane prepolymers, such as those that are the reaction product of a polyol, preferably a polyoxyethylene polyol, with a polyisocyanate. Preferred prepolymers are those disclosed in U.S. Pat. No. 3,812,619 to Wood (the disclosure of which is hereby incorporated by reference), and are commercially available under the name HYPOL® from Hampshire Chemical Corp.

Preferably the ratio of prepolymer to as supplied aggregate is 0.02–0.14:1, more preferably 0.05–0.07:1, most preferably 0.07:1. The particular ratio will depend on the nature of the aggregate being used, and can be readily determined by those skilled in the art without undo experimentation. Preferably the amount of water added is about 1–16 kg/ 5kg aggregate. The chart below shows some suitable formulations:

| MEDIA | DENSITY (g/l) | Substrate (g) | HYPOL® (g) | WATER (l) |
|---|---|---|---|---|
| PERLITE (Grade 1) | 88 | 1.500 | 120 | 3.5 |
| AGRAPERLITE (grade 2) | 85 | 1.500 | 120 | 3.5 |
| VERMICULITE | 94 | 3.500 | 250 | 7.5 |
| PUMICE (stones from Iceland) | 637 | 10.000 | 200 | 2.0 |
| FLUGZAND (fine sand) | 841 | 10.000 | 200 | 2.0 |
| PEAT | 225 | 5.000 | 200 | 15.0 |

Turning now to FIG. 1, there is shown suitable apparatus or preparing grow plugs in accordance with the present invention. A plurality of trays are provided with suitable impressions to contain the plugs. A tray destacker 1 can be utilized to consolidate space, and to hold the plurality of trays to be filled with the slurry prepared as discussed below. These trays can assume any desired configuration, each typically including a plurality of apertures or moulds shaped depending upon the desired shape of the final plug. Typical shapes include cylindrical and frusto-conical. The destacker 1 unloads individual trays onto a conveyor means, such as a conveyor belt 20, which transports the trays to a sprayer 2. The sprayer 2 sprays a release agent onto each tray in order to facilitate removal of the plug from the tray, once formed. Any conventional release agent that is not phytotoxic can be used, although the preferred release agent comprises lecithin.

The trays coated with release agent proceed along conveyor belt 20 to a mixer 3. The mixer 3 mixes the various components of the slurry which ultimately cure in the tray to form the grow plug. The slurry includes the aggregate, the hydrophilic polyurethane prepolymer binding agent, and water, which preferably are each supplied to the mixer 3 separately.

In the embodiment illustrated in FIG. 1, the binding agent is housed in containers 11 which communicate with the mixer 3 through suitable ducting; the aggregate is housed in container 15, which communicates with the mixer via the conveyors 12 and 13; and water is housed in container 14, which communicates with the mixer 3 through suitable ducting. Once the components are emptied into the mixing chamber of the mixer 3, the mixing is commenced. Although the order of addition of the ingredients is not critical, preferably the aggregate is added to the mixing chamber first followed by the addition of water and finally binding agent.

It is critical to the process of the present invention that the temperature of the slurry to be mixed, the temperature during mixing, and the temperature during curing be low, suitably less than 20° C., preferably less than 10° C., most preferably less than 6° C. The low temperature ensures that the reaction proceeds slowly, which the present inventors have found results in a desirably stable product having a suitable air space. More specifically, by ensuring a slow prepolymer cure rate, a homogeneous mix can be achieved even if the mixing is conducted under low shear so as not to damage the aggregate particles, sufficient air from mixing and carbon dioxide from blowing (resulting from the reaction between the prepolymer and water) can become entrained to provide a low density product, and the resulting homogeneous mix can be suitably emptied into moulds.

The temperature of the slurry can be best controlled by controlling the temperature of the water added to the aggregate and binding agent. Thus, the temperature of the binding agent can be relatively high, such as 40–50° C., yet upon the addition of suitably cold water to the binding agent and aggregate, the resulting slurry will have the desired temperature as long as the water temperature is properly regulated. Since the amount of water greatly exceeds the amount of binding agent, the initial temperature of the binding agent has virtually no effect on the temperature of the slurry.

It is also critical to the present invention that the mixing be conducted under shear low enough so as to minimize and preferably avoid damage to the aggregate fibers. Stated differently, the length of the aggregate fibers prior to mixing should be substantially the same as the length after mixing is completed; virtually no grinding or decimation of the fibers should take place, so that the total surface area of the aggregate prior to mixing is the same or substantially the same as the total surface area of the aggregate after mixing, regardless of the residence time of the mixture in the mixing chamber.

This can be measured in terms of particle size distribution; the particle size distribution of the aggregate prior to mixing should be the same or substantially the same as he particle size distribution of the aggregate after mixing. Those skilled in the art will appreciate that the starting aggregate should be virgin aggregate; that is, commercially available "as is" aggregate that has not been ground.

In order to minimize or prevent particle damage during mixing, especially damage to the larger particles, the mixing should be carried out under low shear. To that end, the mixing chamber is preferably equipped with a four rotating arms mixer, with each mixer arm having a length of about 15–50 cm and more preferably 25 cm and is operated at about 150 rpm. Those skilled in the art can easily determine other suitable low shear mixers by trial and error; a mixer meets the requirements of the present invention as long as the mixer does not shred or otherwise substantially damage or grind the aggregate fibers, especially the larger (e.g., greater than 35 mesh) particles, during mixing, yet produces a homogeneous mix during a mixing time that is long enough to allow a sufficient air to become entrained, but is short enough so that the binding agent does not cure in an amount sufficient to prevent filling of moulds, or in amount sufficient to cause the media to break into clumps, thereby weakening the product.

The present inventors have found that with the HYPOL® hydrophilic prepolymer binding agent preferred in the instant invention, a residence time in the mixer of from about 30 seconds to about 4.5 minutes, preferably from about 60 seconds to about 2 minutes, most preferably about 1.5 minutes, results in a homogeneous product having ideal, stable air space.

Whether a particle mixer is capable of forming a homogeneous mix can be determined visually; in non-homogeneous mixes, large particles of cured polymer are readily visible, and/or the resulting media is relatively weaker than otherwise identical media made from homogeneous mixes.

Since the temperature of the mix is sufficiently low to inhibit substantial curing of the prepolymer, the prepolymer has an opportunity during the mixing period to infuse into the interstices amongst the aggregate fibers in an amount sufficient to form a homogeneous composition that upon curing, is strong, cohesive, stable and self-supporting. In view of the lowered temperature of the mix, relatively long mixing times under low shear that may be necessary to achieve a homogeneous mix can be used without allowing the prepolymer to cure enough to deleteriously inhibit mixing or the filling of the mix into suitable moulds or trays.

It has been observed that after mixing after a first period of time the mixture begins to expand. After the expansion time, a period of degassing and curing follows. This is for example described in detail in EP 0090910-A3. In contrast to the European application the invention aims to realize volume expansion during the mixing phase. During this phase there will be cross-linking and it is essential that the structure obtained is maintained as much as possible. Because of that the conditions under which mixing is effected are particularly critical for subject application. This means that immediately after mixing the mix can be cast in the trays which trays can be shipped to the users. There is no necessity to positions made on top of the trays to prevent volume expansion because such increase in volume will substantially not be present. This also means that the slurry can be immediately cast in the trays and shipped to the users without the necessity of intermediate set of trays to be used.

The present invention is characterized by a batch mixing operation coupled with a continuous fill operation. Thus, the various components making up the growing media are metered into a mixing chamber on a batch basis, are mixed, and then empty directly i.e. without intermediate step of accessory means into a tray filling machine 5 (FIG. 1). While in the tray filling machine 5, the mix is slowly tumbled or agitated, and is continuously forced out the bottom of the tray filling machine 5 into suitable trays or moulds properly spaced and aligned on conveyor belt 20. The speed of conveyor belt 20 is regulated so that the filling operation is continuous; i.e., it is based upon the predetermined mixing time in the mixer 3, so that there is always some mixed growing media composition in the tray filling machine 5 during the operation. The amount of product emptying into each tray is controlled by a weighing device 4. The product cures in the trays in about 5 minutes at room temperature. The batch mixing/continuous filling operation allows for different moulds or trays without retooling. In contrast to the prior art no auxiliary means are used i.e. no cover plates, base members, receptacles are used during filling of the trays and no pressure is exerted to prevent rising of the material out of the trays. However, in the subject invention, it is possible to cover the trays with a perforated plate so that a tray is filled partially. Immediately after partially filling, the plate can be removed.

The trays containing cured product can then proceed to a dibbler station 9, where a suitable cutting or hole is made in each plug to accommodate a seedling or the like. Tray stackers 6 and 10 and tray destacker 8 can be placed along the path of travel to conserve space.

Those skilled in the art will recognize that other additives can be included in the growing media, such as nutrients, wetting agents, fertilizers, fungicides, pesticides, pH adjusters such as lime, etc.

Preferably such additives are added during the batch mixing stage, and if water soluble, can be rapidly water soluble or can be released over an extended period of time.

The invention will be further illustrated by the following non-limiting examples.

EXAMPLE 1

A slurry is prepared from the following components:

5 kg peat soil (containing 47% by weight moisture)
200 g HYPOL® 2002
15 kg water The temperature of the water added was 5° C. The resulting slurry was mixed in a mixer having four arms 25 cm long at 100 rpm for 1.5 minutes. The resulting dispersion was cast in packaging trays and hardened within 3–4 minutes at a temperature of about 10° C.

The resulting plug had excellent density and did not crumble or fall apart.

EXAMPLE 2

The procedure of Example I was repeated, except that 6 kg of ground coconut fiber was used instead of peat soil, and the slurry was prepared using 210 g resin forming solution and 4 kg of water. The resulting plug obtained was a coherent body having excellent density.

EXAMPLE 3

Berger blonde golden spaghnum peat moss was used. Moisture content was 35%. It was fluffed for three minutes in a Hobart mixer at 100 rpm. The peat was then sieved with standard mesh sizes 8, 20, 35, 50 and 80 for five minutes. All material left on the mesh 8 screen was discarded and the other fractions were collected and placed in separate bags for each fraction. The peat was then subjected to dry mixing simulating low shear (Hobart mixer for 90 seconds at 500 rpm) and high shear (modified hand drill with a homogenizing blade inside a plastic container having an inside diameter (3.5 inches; height of 7 inches) slightly larger than the blade diameter (2.75 inches) to ensure a high degree of contact between the blade and the media). The resulting particle size distributions for each are set forth in Table 1:

TABLE 1

|  | CONTROL | LOW SHEAR | HIGH SHEAR |
|---|---|---|---|
| MESH 20 | 31.4% | 28.2% | 14.77% |
| <20 >80 | 56.2% | 54.5% | 65.1% |
| <80 | 12.4% | 17.3% | 20.2% |

The data demonstrates that under low shear, little damage is done to the particles. In contrast, under high shear, substantial damage is done, especially to the larger fibers, i.e., only 14.77% of the fibers were retained by a mesh 20 sieve, compared to 31.4% in the control.

The fluffed and screened peat of the various particles sizes was weighed and re-combined in its exact original particle size distribution. The peat having this recreated particle size distribution was conditioned by adding sufficient water to bring the density from its original 100 grams/litre to 180 grams/litre (This conditioning step prepares the media for the addition of a standard amount of water in order to produce mixtures that are consistent from batch to batch, regardless of initial (preconditioned) density/moisture content.) The resulting compositions were mixed in a Hobart mixer for 2 minutes at 100 rpm. Table A sets forth various data recorded for different particle sizes of peat, and shows that for smaller particle sizes, significantly more water is required:

Again, the data confirms that substantial damage is done to the fibers of the aggregate at high shear, especially the larger fibers.

As a control, 200 grams of conditioned peat was placed in a mixing bowl. 500 grams of water at a temperature of 4–5° C. was added. 9 grams of HYPOL® 2002 prepolymer was then added, and the materials were mixed using a Hobart mixer at a rate of 500 rpm for 90 seconds. The resulting mixture was poured into two cylinders having inside diameters of 3 inches and a height of 3.5 inches. Any excess mixture was poured into a graduated beaker.

The wet density (and drained) and strength were determined, and are recorded below. The wet/drained density was determined by allowing the cylinders to drain for between three and four hours at 30° C. Each cylinder with media was weighed. The media was removed from the cylinder for use in the strength and dry density tests below). The cylinder tare weight was subtracted from this total weight and the resulting weight was divided by the volume of the cylinder (403.29 cc). The strength of he wet (and drained) media was determined by sieving using screens with mesh ⅜ inch, 8 and 20. The amount of media remaining on each screen after sieving was recorded to measure the relative strength of the samples.

A mixing time experiment was carried out comparing the control (90 seconds of mixing) with samples that were mixed for only 30 seconds (Sample 2) and 300 seconds (Sample 3). The results are shown in Table 3 below.

The results demonstrate that mixing for too short a period of time (Sample 2) results in more dense media (21% in this case), and that mixing for too long a period of time (300 seconds) results in an even denser (54% in this case) media. Higher density translates to less air space, media that is too wet (which is deleterious to the roots of the plants or seedlings, and can result in root rot), and higher media manufacturing costs (i.e., lower yields).

A particle size experiment was carried out by preparing samples having only relatively large particle size aggregate (Sample 4), smaller particle size (Sample 5), and very small particle size (Sample 6) to the control. The data in Table 3

TABLE A

| CONCEPT | CONTROL PEAT | PEAT MESH SIZE 20 | PEAT MESH SIZE 35 | PEAT MESH SIZE 35 |
|---|---|---|---|---|
| SAMPLE WEIGHT (g) | 100.0 | 100.0 | 80 | 41.5 |
| INITIAL DENSITY (g/l) | 100.0 | 79.8 | 78.6 | 83.0 |
| WATER ADDED (g) | 110.0 | 130.0 | 118.0 | 110.0 |
| FINAL DENSITY (g/l) | 180 | 178 | 180 | 185 |
| WATER TO ADD/100 g PEAT | 100/100 | 130/100 | 147.5/100 | 266/100 |

The conditioned peat was sieved using standard mesh sizes 8 and 35. The larger meshes were used because the conditioned peat had swelled as a result of absorbing the water used in the conditioning step. The conditioned peat was sieved for five minutes, and the results of low and high shear mixing (as carried out above) are shown in Table 2:

TABLE 2

|  | CONTROL | LOW SHEAR | HIGH SHEAR |
|---|---|---|---|
| MESH 20 | 6.0% | 2.8% | 0.2% |
| <80 >35 | 93.2% | 95.1% | 97.6% |
| <35 | 0.8% | 2.1% | 2.2% | demonstrate that using large particle size media results in good media having properties similar to the control. However, as the particle size decreases, air space begins to decrease, and the media becomes markedly weaker. As particle size becomes very small (simulating ground aggregate), the media becomes even denser, air space is reduced, and the media remains visually very wet.

A water amount experiment was conducted wherein a sample containing too little water (Sample 7) and a sample containing too much water (Sample 8) were compared to the control. Table 3 shows that although using too little water results in a low density, high air space media, the air space is not stable (i.e., it decreases over time), and the media was not cohesive but rather was very weak. Using too much water results in a high density, low air space media that retains too much water is deleterious to plantings.

TABLE 3

| | 1 CONTROL | 2 MIXING TIME EXPERIMENTS | 3 MIXING TIME EXPERIMENTS | 4 PARTICLE SIZE EXPERIMENTS | 5 PARTICLE SIZE EXPERIMENTS | 6 PARTICLE SIZE EXPERIMENTS | 7 WATER AMOUNT EXPERIMENTS | 8 WATER AMOUNT EXPERIMENTS |
|---|---|---|---|---|---|---|---|---|
| PREPOLYMER AMOUNT (g) | 9 | 9 | 9 | 9 | 9 | 9 | 9 | 9 |
| MIXING SPEED (rpm) LOW SHEAR | 500 | 500 | 500 | 500 | 500 | 500 | 500 | 500 |
| MIXING TIME (sec) | 90 | 30 | 300 | 90 | 90 | 90 | 90 | 90 |
| AGGRETATE PARTICLE SIXE DISTRIBUTION | STD* | STD* | STD* | <8>20 | <20>35 | <35>50 | STD* | STD* |
| AGGRETATE AMOUNT (g) | 200 | 200 | 200 | 200 | 200 | 200 | 200 | 200 |
| WATER ADDED (g) | 500 | 500 | 500 | 500 | 500 | 500 | 200 | 800 |
| DENSITY, WET (g/ml)** | 0.50 | 0.60 | 0.75 | N.A. | N.A. | N.A. | 0.43 | 0.58 |
| STRENGTH | GOOD | GOOD | GOOD | GOOD | WEAK | n.D. | VERY WEAK | WEAK |
| COMMENTS | | DENSITY HIGH | DENSITY HIGH | LIKE CONTROL | | TOO WET TO SIEVE | | |
| DENSITY DRY (g/l)*** | 78 | 90 | 130 | N.A. | N.A. | N.A. | 60 | 110 |

*Standard (STD) particle size distributions for fluffed, screened "as is" peat as set forth in Table 1.
**Density after drying for four hours at 30° C..
***Density after drying for 24 hours at 105° C.
N.D. = not determinable
N.A. = not applicable

What is claimed is:

1. Method for preparing cohesive, stable, self-supporting, homogeneous, open celled growing media, said method comprising forming a slurry consisting essentially of aggregate comprising particles having a particle distribution, hydrophilic polyurethane prepolymer, and water; mixing said slurry at a temperature below about 20° C., said mixing being conducted for a time sufficient to create a homogeneous mix; forcing said mixture into at least one mould and allowing the mixture to ultimately cure in said mould, wherein during mixing about 90% of the volume increase in the transition from slurry to cured growing media is effected and wherein said mixing is conducted under low shear so as to not damage the aggregate particles.

2. Method according to claim 1, wherein said aggregate is selected from the group consisting of peat, soil, coir/cocospeat (coconut husk), perlite, vermiculite, pumice, baked clay, wood pulp, ground tree bark, sawdust, and mixtures thereof.

3. Method according to claim 1, wherein said prepolymer and aggregate are present in a ratio of 0.02–0.14:1.

4. Method according to claim 1, wherein said slurry has a temperature below about 20° C. and is mixed with a shear sufficiently low so that said particle distribution of said aggregate is not materially altered.

5. Method according to claim 1, wherein an aggregate is provided having a pre-mix particle size distribution; and said aggregate is mixed with hydrophilic polyurethane prepolymer and water, said water having a sufficiently low temperature so that when said water is mixed with said aggregate and prepolymer, the temperature of the mix is adjusted to below about 20° C.

6. Method according to claim 1, comprising:

a. mixing, in a batch, aggregate, hydrophilic polyurethane prepolymer and water;

b. transferring the resulting homogeneous mix into a vessel;

c. continuously and directly filling moulds with said homogeneous mix from said vessel; and d. allowing the resulting mix to harden in said moulds.

7. Method according to claim 6, wherein the molds are trays containing cured products in the form of plugs provided with a suitable cutting of hole in each plug to accommodate a seedling.

8. Method according to claim 1, wherein mixing is effected during 30–120 sec.

9. Method according to claim 1, wherein mixing is effected during 40–70 sec.

10. Method according to claim 1, wherein after forcing the slurry is cast in trays, remaining uncovered after filling.

11. Method according to claim 1, wherein after filling said trays are immediately removed from the filling site.

12. Method according to claim 1, wherein said mixing is conducted longer than 30 seconds and shorter than 300 seconds.

* * * * *